May 20, 1924.
W. P. ALLEN
1,494,568
TRACTION MEMBER FOR CRAWLER TRACTORS
Filed March 20, 1920
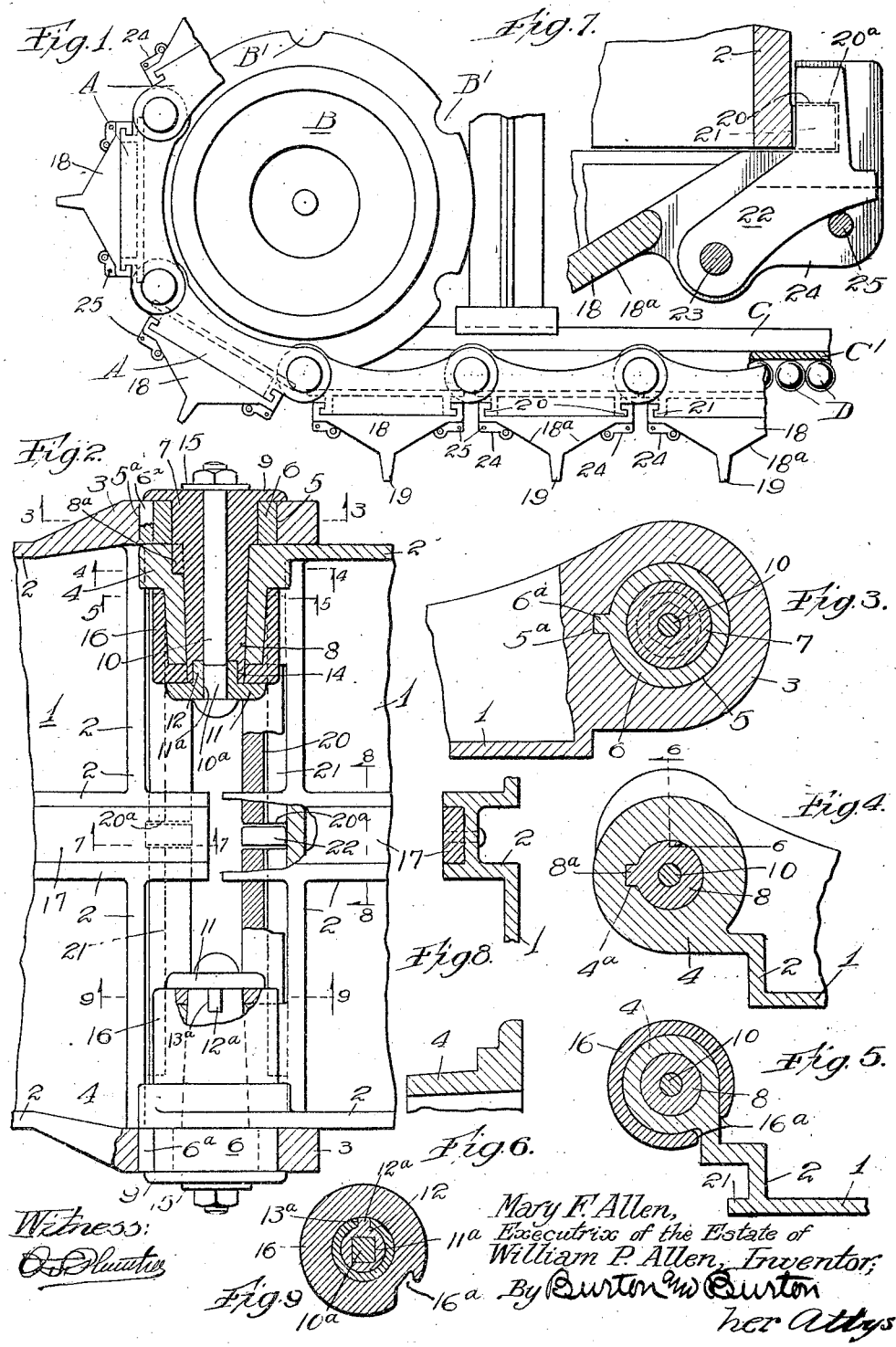

Patented May 20, 1924.

1,494,568

UNITED STATES PATENT OFFICE.

WILLIAM P. ALLEN, DECEASED, LATE OF CHICAGO, ILLINOIS; BY MARY F. ALLEN, EXECUTRIX, OF CHICAGO, ILLINOIS, ASSIGNOR TO HAZEL M. MERRILL, OF CHICAGO, ILLINOIS.

TRACTION MEMBER FOR CRAWLER TRACTORS.

Application filed March 20, 1920. Serial No. 367,407.

*To all whom it may concern:*

Be it known that I, MARY F. ALLEN, a citizen of the United States, with residence at Chicago, in the county of Cook and State of Illinois, am the executrix of the last will and testament of William P. Allen, deceased, late resident of Chicago, Illinois, who had invented certain new and useful Improvements in Traction Members for Crawler Tractors, of which the following is a specification, reference being had to the accompanying drawings, forming a part thereof.

This invention relates to details of construction of a flexible traction member for that type of tractor which employs an endless belt, driven in direct contact with the road's surface. This application is a continuation in part of my Patent No. 1,340,514, dated May 18, 1920, and is especially concerned with three aspects of the traction element; viz., economy of initial manufacture and assembly of the parts, economy and ease of replacement of worn parts, avoiding unnecessary renewal of other portions, and convenience in converting the tractor from a road vehicle to a hauling engine adapted to travel over soft ground as in pulling ploughs, cultivators and the like. The invention consists in the elements and features of construction and their combination contributing to these ends as hereinafter described and shown in the drawings and as indicated by the claims.

In the drawings:—

Figure 1 is a fragmental side elevation of a traction member embodying this invention as applied to a tractor of the type shown in my patent above referred to.

Figure 2 is a detailed plan view, partly in section, showing the construction of the pivotal connection between the links of the traction member.

Figure 3 is a detail section, taken as indicated at line 3—3 on Figure 2.

Figure 4 is a detail section, taken as indicated at line 4—4 on Figure 2.

Figure 5 is a detail section, taken as indicated at line 5—5 on Figure 2.

Figure 6 is a detail section, at line 6—6 on Figure 4.

Figure 7 is a detail section showing locking means for the traction rib, being taken as indicated at line 7—7 on Figure 2.

Figure 8 is a detail section of the replaceable bearing strip, being taken as indicated at line 8—8 on Figure 2.

Figure 9 is a detail section at line 9—9 on Figure 2.

Figure 1 shows several links, A, of what may be understood as an endless or continuous chain or belt mounted upon a carrying wheel, B, with a considerable portion arranged for straight line travel in position for contact with the road surface. In the present construction, a track C, is provided with rolling-bearing members shown as balls, D, interposed between the bearing flange, $C^1$, of the track, and the bearing surfaces of the respective links, A, of the traction member. This track and its further relation to the carrying wheel, B, is more completely described in my patent above referred to, and need not be further considered here.

Each of the links, A, is composed of a body casting, 1, suitably designed with reinforcing ribs and flanges 2, so that its weight shall not be excessive. Each body member, 1, is formed at each end with a pair of lugs, which are designed to receive the pivots by which adjacent links are connected together. As shown, the lugs, 3, at one end of the member are slightly offset from the lateral flanges, 2, so that there may be width between them to receive the lugs, 4, of the adjacent end of the next link member. Each lug, 3, has an aperture, 5, which is rendered non-circular by having a notch, $5^a$, to receive a small key, $6^a$, on the bushing, 6, designed to occupy the aperture, 5, and serve as a bearing for the pivot, 7. This pivot, 7, is carried non-rotatively in the lug, 4, of the next link, being formed with a slightly tapering shank, 8, which may be circular, but provided with a projecting key portion, $8^a$, which will fit a notch, $4^a$, in the lug, 4, to prevent rotation of the pivot, 7, therein. A flange, 9, on the outer end of the pivot, 7, overlaps the bushing, 6, and also the lug, 3, thus preventing the bushing from coming out of its place in the lug, so long as the pivot, 7, remains in position.

The pivot, 7, is held in place in the lug, 4, by means of an ordinary carriage bolt, 10, extending axially through the pivot, 7. A removable flange member, 11, is interlocked with the inner end of the pivot shank, 8, by means of a key, 12ª, formed on a shoulder, 12, which occupies a recess, 14, counterbored in the inner end of said shank, 8, of the pivot, said recess having a notch, 13ª, to receive the key, 12ª. The flange member, 11, has a square axial aperture, 11ª, to receive the square portion, 10ª, of the carriage bolt, 10, just under its head, so that when the flange member, 11, is positioned on the inner end of the pivot, 7, and the carriage bolt inserted therein, the bolt is held against rotation, while its nut, 14, is applied to the outer end, outside the flange, 9, of the pivot, and preferably with a washer, 15, interposed.

Besides serving to hold the pivot, 7, the lug 4, of the link body is also designed to engage one of the notches, B¹, in the wheel, B, to permit the traction chain to be driven by said wheel, B, but preferably instead of having the lug, 4, directly engage the wheel, B, it is fitted with a wearing member, in the form of a cap, 16, which is slipped over the lug, 4, just under the flange member, 11, and is retained thereby as clearly indicated in Figure 2. As shown in Figures 5 and 9, it is necessary to notch the cap, 16, at 16ª, to make room for the transverse rib, 2, formed in the body casting of the link member and, incidentally, this prevents rotation of the cap, 16, upon its supporting lug, 4.

To receive the load transmitted to the links through the bearing balls, B, each link body is fitted with a bearing strip, 17, which may be removably carried in a channel, formed as shown in Figures 2 and 8, between the centrally disposed stiffening ribs, 2, of the link body. This permits using a better grade of material for the bearing strip, 17, than for the body casting, 1, and also insures ease of replacement of said strips when they become too much worn for further use.

For traveling over comparatively soft ground, the tractive efficiency of the traction member is greatly increased by the use of traction shoes, 18, formed with longitudinally sloping bearing surfaces, 18ª, and intermediately disposed transverse traction ribs, or blades, 19, whose function is more completely explained in my Patent No. 1,063,493, dated June 3, 1913; but, for traveling upon a hard road, it is preferable that the traction member present a fairly flat surface to the road bed and these traction shoes, 18, are therefore made removable. Each shoe is formed at opposite ends with oppositely facing grooves or hook-shaped portions, 20, which are transversely slidable upon flanges, 21, of the body member, 1, of each link. Thus, while the method of connection of the traction shoe to the link body insures a perfectly firm engagement in the direction of tractive effort, it permits the ready removal of the shoe by sliding movement in a direction transverse to the direction of said tractive effort. For holding the traction shoes, 18, in place upon the link body, 1, each flange, 20, is formed with a notch, 20ª, (see Figure 7), and the shoe member, 18, is provided with a locking dog, 22, pivotally attached at 23, to permit swinging it into or out of engagement with the notch, 20ª, for locking the shoe on the link body or allowing it to be removed therefrom, as the case may require. The lugs, 24, formed on the shoe, 18, for supporting the pivot, 23, may also be apertured to receive a locking pin, 25, which may be simply a nail or a piece of wire inserted in position to hold the locking dog, 22, in engagement with the notch, 20ª; then, for unlocking the traction shoe, 18, the first step will be to knock out the pin, 25, which may be done with an ordinary hammer or similar tool, even if the pin is slightly bent to retain it against accidental dislodgment.

I claim:

1. A tractor belt, composed of a series of pivotally connected links, the ends of adjacent links being formed to interlap and having non-circular openings in their interlapping portions, a bushing formed to fit the opening in one link and a pivot having a circular portion to fit in said bushing, and a non-circular portion to fit in the opening of the other link, together with means for retaining said pivot against withdrawal from said opening, the pivot having a portion laterally overlapping the bushing, to retain said bushing in its place.

2. A tractor belt, composed of a series of pivotally connected links, the ends of adjacent links being formed to interlap and having non-circular openings in their interlapping portions, a bushing formed to fit the opening in one link, a pivot having a circular portion to fit said bushing, with a flange on one side of said circular portion, and a non-circular part on the other side, formed to fit the opening of the other link and means retaining said pivot against withdrawal from said opening, whereby its flange serves to hold the bushing in place.

3. A tractor belt, composed of a series of pivotally connected links, the ends of adjacent links being formed to interlap, one having a non-circular aperture, the other having a non-circular recess, a bushing formed to fit the said aperture of one link, a pivot having a circular portion to fit said bushing and a non-circular portion to fit said recess of the other link, said other link being apertured through from said recess, said pivot extending through said aperture, a cap and a bolt extending axially through the pivot and through the cap, said cap having non-circular features engaging corresponding features of the pivot and the shank of the bolt respectively to hold said bolt against rotation in the pivot, while its nut is applied.

4. In a crawler tractor a sprocket wheel and a chain therefor, the links of said chain being formed with bosses adapted for driving engagement with the sprocket wheel and a wear-receiving member for each of said bosses in the form of a cap whose annular portion is adapted to encircle the boss in position for immediate contact with the sprocket wheel and means for removably securing said cap to the boss, comprising a bolt passing through the head of the cap and into the boss, whereby the cap is readily removable upon removal of the bolt.

5. In a tractor belt composed of a series of links connected end to end by means of laterally-spaced end portions on one link and an interlapped end portion of the next link extending between said laterally spaced parts, and removable pivot members fitted into the interlapped link ends and pivotally engaging said laterally spaced parts of the next link, said interlapping link ends having inwardly projecting bosses to engage the notches of a sprocket wheel, and a wear cap for each of said bosses together with a bolt extending axially through the wear cap and pivot member for removably holding said parts in assembled relation.

6. A tractor belt composed of sections, each including a member, constituting a permanent part of the belt, and a traction blade disengageably applied to such member and adapted for removal therefrom by lateral movement substantially in its own plane, one of said members having an abutment and a movable key on the other member adapted to engage said abutment to lock the blade in place, together with a second key positioned to hold the first key in locking position.

7. A traction member comprising a series of traction blades extending transversely of the direction of travel at the road-engaging portion of the member for transmitting the tractive effort; a tongue-and-groove connection arranged to prevent displacement of the blade either vertically or in the direction of tractive stress with respect to the traction member, but adapted to permit removal of the blade by horizontal sliding movement transverse to the direction of travel, the tongue and the walls of the groove having notches which register when the blade member is properly positioned, and a locking dog pivoted to each blade member for swinging into engagement with the registered notches.

8. A tractor belt composed of sections, each including a member constituting a permanent part of the belt, and a traction blade disengageably applied to such member; a tongue-and-groove connection arranged to prevent displacement of the blade either vertically or in the direction of tractive stress with respect to the traction member, but adapted to permit removal of the blade by horizontal sliding movement transverse to the direction of travel, the tongue and the walls of the groove having notches which register when the blade member is properly positioned, and a locking dog pivoted to each blade member for swinging into engagement with the notch of the traction belt, together with removable means for holding the locking dog in such engagement.

9. In a crawler tractor comprising an endless traction belt composed of pivotally connected links and means for supporting and guiding such belt at opposite ends of its run; a track extending between said supporting means with load-transmitting bearing members interposed between said track and the links thereunder, each of said links having a groove medially formed in its upper surface, and a wear-receiving strip of uniform cross section removably secured in such groove.

In testimony whereof, I have hereunto set my hand at Chicago, Illinois, this 10th day of March, 1920.

MARY F. ALLEN,
*Executrix of William P. Allen, deceased.*